United States Patent Office 3,637,663
Patented Jan. 25, 1972

3,637,663
FLUORINE-CONTAINING DIAZIRINES
Ronald A. Mitsch, Falcon Heights, Minn., assignor to Minnesota Mining & Manufacturing Company, St. Paul, Minn.
No Drawing. Continuation-in-part of applications Ser. No. 188,926, Apr. 16, 1962, and Ser. No. 196,859, May 21, 1962. This application Sept. 9, 1963, Ser. No. 307,730
Int. Cl. C07d 45/00
U.S. Cl. 260—239 AA    24 Claims This application is a continuation-in-part of copending applications Ser. No. 188,926, filed Apr. 16, 1962, now U.S. Pat. No. 3,407,232, and Ser. No. 196,859, filed May 21, 1962, now abandoned.

This invention relates to certain fluorine-containing compounds and more particularly to a novel and useful class of fluorine-containing diazirines.

It is an object of the present invention to prepare a novel and useful class of fluorine-containing diazirine compounds. It is another object of the invention to provide a new and valuable class of synthesis intermediates. It is a further object of the invention to provide a source of reactive carbene diradicals which contain fluorine and which may contain functional groups. It is a still further object of the invention to provide a novel method for the preparation of perfluoroalkenes (including tetrafluoroethylene) as well as certain highly useful saturated compounds. Other objects will become apparent to those skilled in the art from reading the following specification.

Only a few diazirine compounds which contain only hydrogen and hydrocarbon alkyl substituents are known. A new class of diazirines which contain at least one fluorine-containing substituent, and which also may contain a wide variety of chemically reactive and physically important functional substituents has now been discovered. An unexpected discovery is that the fluorine-containing substituents, many of which are electron withdrawing, do not impart deleterious instability to the diazirine compounds.

The compounds of the invention contain from 1 to 18 carbon atoms and have a diazirine ring to which are attached two covalently bonded substituents, $R^1$ and $R^2$, and have the formula:

$$\begin{array}{c} N = N \\ \diagdown \; \diagup \\ C \\ \diagup \; \diagdown \\ R^1 \quad R^2 \end{array}$$

At least one of the covalently bonded substituents ($R^1$) contains covalently bonded fluorine.

The structure of the fluorine-containing substituent, $R^1$, can vary widely. Fluorine can be attached directly to the ring or can be attached through a linking radical such as, but not limited to, —NF—, alkylene, arylene, aralkylene and halogenated radicals thereto.

These carbon-containing linking radicals can be straight or branched chains or can have cyclic structures. The carbon atoms contained therein can be linked together by oxygen atoms or nitrogen atoms. These linking radicals can contain substituent groups such as those described hereinafter.

The other substituent, $R^2$, can vary widely as further described.

Each substituent can contain chemically reactive functional groups or atoms such as chlorine, bromine, iodine, carboxyl, sulfonic acid, amino, isocyanate, difluoramino, ether, vinyl, carboxylate and sulfonic acid salts, cyano, nitro and the like. The substituent groups can also contain oxygen, nitrogen, sulfur, phosphorus, and silicon in a large array of configurations. These groups and configurations can be attached to the diazirine ring through carbon, oxygen, nitrogen, sulfur, phosphorus and silicon bonds provided that such bonds are substantially covalent.

A group of interest of the diazirine compounds of the invention are those which contain physically important and/or chemically reactive functional groups in the substituents $R^1$ and/or $R^2$. Such chemically reactive functional groups are described above. Typical physically important functional groups which illustrate what is signified by this term with respect to the present invention are alkyl, aryl and aralkyl substituents containing more than about 40 percent by weight fluorine.

A smaller group of interest of the diazirine compounds of the invention is that in which $R^1$ and $R^2$ on the diazirine ring are selected from the class consisting of fluorine, difluoramino, perhalocarbon groups containing from 1 to 6 carbon atoms in which not less than 60 percent of the halogen atoms are fluorine and the remainder are chlorine or bromine and wherein $R^1$ and $R^2$ can combine to form three to six-membered perhalocycloaliphatic rings through the carbon atoms to which they are attached.

Such perhalocarbon groups can be perhaloalkyl groups having acyclic straight- or branched-chains, or can have cyclic structures (e.g. perfluorocyclohexyl). Similarly, two carbon atoms of the perhalocarbon group can be linked together by an oxygen atom or three carbons can be linked together by a nitrogen atom, because oxygen and nitrogen provide very stable linkages between perhaloaliphatic groups of the complete halocarbon group or structure.

Each substituent $R^1$ and $R^2$ on the diazirine ring must be free from reactive organometallic groups such as

and the like. Preferably each substituent $R^1$ and $R^2$ should be free from very strongly oxidizing groups, i.e. those which have an oxidation potential greater than that of the fluoroxy moiety, —OF (such as in the compound $CF_2(OF)_2$).

The fluorine-containing diazirine compounds of the invention are relatively stable and special precautions for their handling and storage are ordinarily unnecessary. Difluoro-diazirine, a low molecular weight member of the class which contains two very strongly electron-withdrawing groups, is very stable, contrary to what might be expected. Thus, this compound can be stored for extended times at ambient temperatures as a gas without difficulty and the other members of the class are correspondingly easy to store. This stability is an added advantage of the compounds.

The fluorine-containing diazirines are prepared by reductive defluorination cyclization of several different types of compounds, all of which contain at least two N—F bonds, at which sites the reductive defluorination cyclization reaction occurs. Suitable NF containing starting materials (wherein $R^1$ and $R^2$ are as heretofore described) are:

(1) Bis-difluoroamino compounds;

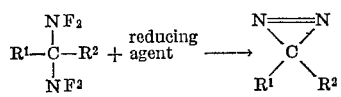

(2) Tris-difluoramino compounds;

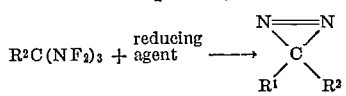

(In 2, $R^1$ is always —F or —$NF_2$. The products from this reaction wherein $R^1$ is —F are formed by a novel rearrangement and/or displacement reaction during the reductive defluorination cyclization. Such a substitution of —F for $R^1$ is also seen occasionally in the other methods of preparation. The extent of the displacement can be controlled by experimental conditions.)

(3) Difluoramino fluorimino compounds;

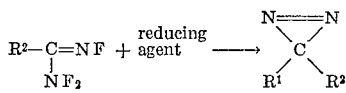

(In this case $R^1$ is always fluorine.)

(4) N,N'-difluoro-diaziridine compounds;

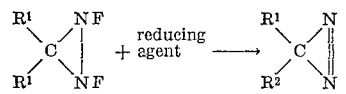

(5) Bis-difluoramino-fluoramino compounds;

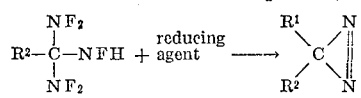

(In this case $R^1$ is usually fluorine.)

The availability of these several different methods of preparations allows for the introduction of a wide variety of different substituent groups $R^1$ and $R^2$.

Certain of the intermediate bis(difluoramino)fluorocarbons are covered in my copending U.S. patent application Ser. No. 188,926, filed Apr. 16, 1962, now U.S. Pat. No. 3,407,232, and may be represented by the formula

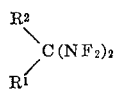

Other methods for preparing the starting materials for the compounds of the invention are described in copending U.S. patent applications Ser. No. 188,926, filed Apr. 16, 1962, now U.S. Pat. No. 3,407,232; Ser. No. 300,956, filed Aug. 5, 1963; Ser. No. 99,632, filed Mar. 30, 1961; Ser. No. 239,101, filed Nov. 14, 1962; Ser. No. 232,327, filed Oct. 15, 1962 and Ser. No. 286,881, filed May 29, 1963.

The reaction of the nitrogen-fluorine containing starting materials to form the fluorocarbon diazirine compounds is carried out in the presence of a reducing agent and at from about 0 to 50° C. Some reaction occurs in many cases below this temperature range, and while it is slow, there may be compensating advantages where the products are highly oxidizing in nature and therefore less stable. At temperatures above this range, on the other hand, the speed of the reaction is often excessive and there is a possibility of the degradation of either the fluorinated reactant or the product itself. This is particularly true in the case of the fluoramino group-containing reactants since these materials are oxidizing agents which may react violently and even explosively if not handled with care. The fluorinated starting materials are generally gases or liquids at ambient temperatures and are handled with suitable techniques to avoid the use of unnecessarily high pressures. Glass or glass-lined equipment is suitable although stainless steel and other metals can also be used.

The reducing agent is preferably mixed with a solvent in which it has at least moderate solubility and which is relatively inert with respect to the reactants and the product of the reaction at the temperaures employed. The fluorinated starting material is then brought into contact with this mixture, whereby the reaction begins. The reaction is generally accompanied by a mild exotherm and proceeds smoothly to completion, good to excellent yields being obtained in many cases. The length of time required for the reaction varies widely, depending upon the particular conditions selected. The fluorocarbon diazirine products can be gases or liquids which can then be easily volatilized from the reaction mixture and condensed in one or more suitably cooled traps. The fluorocarbon diazirine products can also be solids which can then be recovered from the reaction mixture by recrystallization or liquid column chromatography.

Among the reducing agents which are suitable for use in the process of the invention are sandwich-bonded organometallic reducing agents, inorganic reducing agents and organic reducing agents. Reducing agents of weak and moderate strength are ordinarily preferred for reduction of the unsaturated starting compounds (the difluoramino fluorimino compounds) and diaziridines and N-hydrofluoramines while reducing agents of moderate strength are preferred for the reduction of the saturated starting compounds, such as the bis(difluoramino) and tris(difluoramino) compounds. In using either class of starting materials, the stronger reducing agents can also be used although some difficulty in controlling the reaction to obtain the desired products is often encountered. Among the particularly useful reducing agents are dicyclopentadienylmanganese (II), dicyclopentadienylruthenium (II), dicyclopentadienylnickel (II), dicyclopentadienyltitanium (II) and dicyclopentadienyliron (II) as well as substituted derivatives thereof, dicumenechromium (II), dibenzenechromium (II), potassium iodide, potassium bromide, diphenyl amine, hydroquinone, etc.

As previously noted, the solvent which is chosen for a particular reaction according to the invention will ordinarily be relatively inert with respect to the materials with which it will come into contact and will dissolve the reducing agent to an appreciable extent. Thus a mixture of 90–99% acetonitrile and 10–1% water may be used with potassium iodide (the water being needed to dissolve the potassium iodide but having a tendency to cause decomposition in the reaction mixture and consequent loss of product when used in higher concentration) while various solvents, such as xylene hexafluoride, benzotrifluoride, acetonitrile, benzene, carbon tetrachloride, tetrahydrofuran, fluorotrichloromethane, dichlorodifluoromethane, etc., can be used with the sandwich-bonded organometallic reducing agents.

Groups such as acid halides and acid anhydrides, reducing groups such as ionically bonded iodide and bromide, aromatic rings substituted by hydroxyl groups and thiols can be introduced in the final diazirine products after formation of the diazirine ring. Hydroxyl and thiol and the like groups can also be present during formation of the diazirine ring if suitably protected.

When photolyzed and/or pyrolyzed, the diazirine compounds of the invention lose $N_2$ and form the corresponding fluorine-containing diradicals of the formula:

These diradicals can combine with diradicals of the same species to form symmetrical fluorine-containing olefins. They will also combine with diradicals of other fluorine-containing diazirine compounds to form asymmetrical fluorine-containing olefins and with free radicals of chlorine, fluorine, bromine, diazomethane, dinitrogen tetroxide, etc. to form a great variety of useful compounds.

The products of the photolysis and/or pyrolysis of the fluorine-containing diazirine compounds of the invention with halogens are useful as solvents, reaction media, extraction media, dielectrics, hydraulic fluids, heat transaerosol bomb propellants; the products of the photolysis compounds are valuable monomers, as are the products of the individual simpler fluorine-containing diazirine compounds are valuable monomers, as are the products of the photolysis of certain of the simpler fluorine-containing diazirine compounds with diazomethane; etc.

Thus, tetrafluoroethylene is conveniently prepared by photolysis of difluorodiazirine, dichlorodifluoromethane is prepared by photolysis of a mixture of difluorodiazirine and chlorine, vinylidene fluoride is prepared by photolysis of a mixture of difluorodiazirine and diazomethane, perfluoropropane is prepared by photolysis of a mixture of difluorodiazirine and perfluoromethyldiazirine, 1,1-dichlorotetrafluoroethane is prepared by photolysis of a mixture of perfluoromethyldiazirine and chlorine and difluorodinitromethane is prepared by photolysis of a mixture of difluorodiazirine and dinitrogen tetroxide. Preparation of other useful products from the photolysis of mixtures of the fluorine-containing diazirine compounds with coreactants are further exemplified in the following table.

TABLE I

| Fluorine-containing diazirine | Coreactant | Photolysis product |
|---|---|---|
| Perfluoroethyldiazirine | $Cl_2$ | 1,1-dichloroperfluoropropane. |
| Perfluorodibutyldiazirine | $Cl_2$ | 5,5-dichloroperfluorononane. |
| Perfluorocyclohexyldiazirine | $F_2$ | Perfluorocyclohexane. |
| 1-chloroperfluorodimethyldiazirine. | $Cl_2$ | 1,2,2-trichloro-1,1,2-trifluoroethane. |
| $N_2CFOCH_2CH_2OCFN_2$ | $Br_2$ | $Br_2CFOCH_2CH_2OCFBr_2$ |

The following examples will more specifically illustrate the process of the invention and the compounds obtained thereby.

EXAMPLE 1

Difluorodiazirine

A dry 10 cc. capacity heavy-walled glass ampoule is charged with 4.84 g. ($2.60 \times 10^{-2}$ mole) of dicyclopentadienyliron and 6 ml. of xylene hexafluoride. This mixture is cooled to liquid nitrogen temperature and degassed by reducing the pressure in the ampoule to not more than about 0.1 millimeter of mercury. 1.62 grams ($1.04 \times 10^{-2}$ mole) of bis(difluoramino)difluoromethane (prepared by method of Ser. No. 99,632, filed Mar. 30, 1961, B.P. $-32°$ C.) are then introduced into the ampoule by condensation, the ampoule is sealed and the reactants are allowed to come to room temperature (i.e. approximately 25° C.). The mixture is a solution of the bis(difluoramino)difluoromethane in the xylene hexafluoride with the ferrocene being only partly in solution. It is allowed to stand for 4 days at 25° C. during which time the ampoule is shaken occasionally. At the end of this period, the original orange color of the ferrocene (i.e. dicyclopentadienyliron) has been replaced by the deep blue-green color of the resulting ferricinium fluoride. The ampoule is cooled to liquid nitrogen temperature and opened. The volatile products of the reaction are fractionated by allowing the ampoule to warm gradually to room temperature while connected to a vacuum pump through $-23°$ C., $-78°$ C. and $-196°$ C. receivers. The material collected in the $-196°$ C. receiver is subjected to further separation by preparative vapor phase chromatographic trapping techniques which results in its resolution into 20.8 percent of the fluorinated starting material bis(difluoramino)difluoromethane, and 78.3 percent and 0.9 percent of two new products. The major new product is $2.88 \times 10^{-3}$ moles (calculated from the gas laws) of a pure compound, corresponding to a yield of 27.7 percent of theoretical (based on the amount of the fluorinated reactant starting material originally added). It is found to contain 15.5 percent of carbon, 48.5 percent of fluorine and 35.8 percent of nitrogen and to have a molecular weight of 77. This corresponds to an empirical formula of $C_{1.01}F_{1.99}N_{2.00}$. The calculated elemental analysis values for the empirical formula $C_1F_2N_2$ corresponding to the above are 15.4 percent, 48.7 percent, and 35.9 percent, respectively, and the calculated molecular weight is 78. The boiling point of this compound (calculated by extrapolation from the vapor pressure curves) is $-91.3°$ plus or minus 1° C.

This product is also subjected to analysis by nuclear magnetic resonance shielding values ($CFCl_3$ is employed as an internal standard, as described by Filipovich et al., Journal of Physical Chemistry, vol. 63, pp. 761–762, 1959 the $\phi$ values defined by those authors being given simply as $\phi$ values) as well as mass spectrometer and infrared analyses. A single $F^{19}$ nuclear magnetic resonance absorption peak at $+122.5$ $\phi$ (normal $-CF_2$ region) is observed. This eliminates the possible structural isomers other than the one which contains the $-CF_2$ moiety. Thus, rearrangement has occurred and the product is $CF_2N_2$, difluorodiazirine. The mass spectrometer and infrared analyses support this structure.

The continuous preparation of difluorodiazirine is accomplished as follows: The reactor includes two gas-flow metering devices which are connected respectively to sources of nitrogen and gaseous bis(difluoramino)difluoromethane and the outputs of which are merged and led through two bubblers in series. Each bubbler is approximately 1 inch in diameter and 10 inches in length. The first one contains 75 ml. of a solution of 10 grams of potassium iodide, 10 ml. of water and 80 ml. of acetonitrile, and the second contained 50 ml. of the same solution. On the downstream side of this continuous flow reactor there are connected, in series, a calcium sulphate drying tube, a $-25°$ C. trap and a $-196°$ C. trap.

A gaseous mixture of 30 percent by volume of bis(difluoramino)difluoromethane in nitrogen is metered into the continuous flow reactor at a rate of about 11.5 ml./minute for about 3.5 minutes after which the reactor is flushed for 45 minutes with nitrogen. The water in the product stream is removed downstream from the bubblers in the calcium sulphate drying tube, the acetonitrile is collected in the $-25°$ C. receiver and the product is collected in a $-196°$ C. trap. About 5.3 millimoles per hour of a product containing 91.2 percent of difluorodiazirine are recovered.

The preparations of dichlorodifluoromethane and tetrafluoroethylene from difluorodiazirine are carried out as follows:

About 0.0078 g. ($1 \times 10^{-4}$ mole) of difluorodiazirine and 0.071 g. ($1 \times 10^{-3}$ mole) of chlorine are charged to a 50 ml. glass storage bulb, the glass being transmissive to ultraviolet irradiation down to approximately 3000 A. The gaseous mixture is irradiated from a distance of approximately 3 inches with a 125 watt ultraviolet lamp for a period of 7 hours. Comparison of the infrared spectra of the resulting product and of a known sample of dichlorodifluoromethane indicates a greater than 50 percent conversion to the latter.

A small sample of difluorodiazirine is charged to a 15 ml. infrared cell having sodium chloride windows in either end thereof. The sample of difluorodiazirine is sufficient to exert a pressure of 40 millimeters of mercury in the infrared cell at about 25° C. The contents of the infrared cell are then irradiated through the sodium chloride windows with a 125 watt ultraviolet lamp. The course of the reaction is followed by recording the infrared spectrum of the contents of the cell at specified time intervals. The decomposition of difluorodiazirine being measured at the 6.41 micron band and the formation of the photolysis product, tetrafluoroethylene being measured at the 7.47 micron band. After 50 minutes of irradiation a conversion of approximately 38 percent has occurred and after 150 minutes of irradiation, the conversion is more than 90 percent complete to tetrafluoroethylene.

EXAMPLE 2

Difluorodiazirine

A dry 5 cc. capacity heavy-walled glass ampoule is charged with 0.186 g. ($1.0 \times 10^{-3}$ mole) of dicyclopentadienyliron and 1.5 ml. of benzotrichloride. The ampoule is then cooled to liquid nitrogen temperature and the pressure therein reduced to not more than about 0.1 millimeter of mercury pressure. A sample amounting to 0.116 gram ($1.0 \times 10^{-3}$ mole) of perfluoroformamidine (prepared by the method of S.N. 99,632, filed Mar. 30, 1961) is introduced, and the ampoule is sealed. The mixture is allowed to come to room temperature (i.e. about 25° C.) and is shaken at that temperature for 3 hours after which the tube is opened and the product is fractionated as in Example 1. The −196° C. trap is found to contain $2.96 \times 10^{-4}$ mole of a mixture of volatile products. Infrared and chromatographic analyses of this crude mixture indicate that 78.9 percent of the material recovered in the trap is difluorodiazirine.

A 20 ml. reaction flask is charged with 0.0338 g. ($2 \times 10^{-4}$ mole) of diphenylamine and an excess of a solvent consisting of 97 percent acetonitrile and 3 percent water. This mixture is then cooled and degassed as in Example 1 and 0.0116 g. ($1 \times 10^{-4}$ mole) of perfluoroformamidine is introduced into the flask, which is then sealed. The reaction mixture is then allowed to warm to room temperature (approximately 25° C.) and is stirred with a magnetic stirring bar for about one hour. Analysis of the product gases by vapor phase chromatography and infrared spectroscopy indicate that the major product is difluorodiazirine.

0.0187 g. ($1.70 \times 10^{-4}$ mole) of hydroquinone, and 0.020 g. ($1.72 \times 10^{-4}$ mole) of perfluoroformamidine are reacted in the presence of an excess of an acetonitrile-water solvent as in the preparation described in the preceding paragraph except that stirring is continued only for about 30 minutes. Vapor phase chromatography indicates a yield of about 24 percent of the theoretical amount of difluorodiazirine. The identity of this product is verified by comparison of its infrared spectrum with that of an authentic sample.

0.031 g. ($2.6 \times 10^{-4}$ mole) of potassium bromide and 0.015 g. ($1.29 \times 10^{-4}$ mole) of perfluoroformamidine are reacted in the presence of a solvent of 97 percent acetonitrile and 3 percent water as in the preparation described in the preceding paragraph except that stirring is continued for three hours. The infrared spectrum and vapor phase chromatography again indicate formation of difluorodiazirine.

EXAMPLE 3

Difluoraminofluorodiazirine

A dry 10 cc. capacity heavy walled glass ampoule is charged with 0.995 g. ($5.34 \times 10^{-3}$ mole) of dicyclopentadienyliron (ferrocene) and 4 ml. of xylene hexafluoride. This mixture is cooled to liquid nitrogen temperature and degassed by reducing the pressure in the ampoule to not more than about 0.1 mm. of mercury pressure. A sample of 0.500 g. ($2.67 \times 10^{-3}$ mole) of tris(difluoroamino)fluoromethane is introduced into the ampoule by condensation, the ampoule is sealed and the reactants are allowed to come to room temperature (i.e. approximately 25° C.). The mixture is a solution of the tris(difluoroamino)fluoromethane in the xylene hexafluoride with the ferrocene being only partly in solution. It is allowed to stand for 3 hours at 25° C. during which time the ampoule is shaken periodically.

At the end of this period, the original orange color of the ferrocene has been replaced by the deep blue-green color of the resulting ferricinium fluoride. The ampoule is cooled to liquid nitrogen temperature and opened. The volatile products of the reaction are fractionated by allowing the ampoule to warm gradually to room temperature while connected to a vacuum pump through −23° C., −78° C. and −196° C. receivers. The material collected in the −196° C. receiver is subjected to further separation by preparative vapor phase chromatographic trapping techniques which results in its resolution into 12.9 percent of the fluorinated starting material, tris(difluoroamino)fluoromethane, and 69.7 percent and 17.4 percent respectively to two new products. The major new product, difluoraminofluorodiazirine, is found to contain 11.3 percent of carbon, 51.9 percent of fluorine and 38.8 percent of nitrogen and to have a molecular weight of 111 (as determined by the method of Raoult). This corresponds to an empirical formula of $C_{1.02} F_{2.96} N_{3.00}$. The elemental analysis and molecular weight values corresponding to the above for $C_1F_3N_3$ are 10.8 percent, 51.4 percent and 37.8 percent and 111 respectively. The boiling point of this compound (calculated by extrapolation from the vapor pressure curves) is about −36° C.

This product is also subjected to analysis by nuclear magnetic resonance shielding values as well as mass spectrometer and infrared analyses. A broad $F^{19}$ nuclear magnetic resonance absorption peak is observed at $-38.7\phi$. This appears to be due to a difluoramino group. A single carbon-fluorine absorption is observed as a sharp peak at $+159.4\phi$. The area ratio of the peak at $-38.7\phi$ to that at $+ 159.4\phi$ is about 2 to 1. These analyses confirm that the structure of the compound is $F_2N$—$CF$—$N_2$.

The purified difluoraminofluorodiazirine is extremely sensitive and should be handled with care. It should not be cooled below −119° C.

EXAMPLE 4

Difluoraminofluorodiazirine

A dry 10 cc. capacity heavy walled glass ampoule is charged with 0.313 g. ($1.68 \times 10^{-3}$ mole) of dicyclopentadienyliron and 5 ml. of xylene hexafluoride. The ampoule is then cooled to liquid nitrogen temperature and the pressure therein reduced to not more than about 0.1 mm. of mercury pressure. About 0.250 g. ($1.68 \times 10^{-3}$ mole) of perfluoroguanidine, $(NF_2)_2C$=$NF$, is introduced and the ampoule is sealed. The mixture is allowed to come to room temperature (i.e. about 25° C.) and to stand for 3 hours at that temperature with periodic shaking. The ampoule is then opened and the product is fractionated as in Example 1. The −196° C. trap is found to contain $4.35 \times 10^{-4}$ mole of a mixture of volatile products. Infrared and vapor phase chromatographic analyses of this crude mixture indicate that 87.8 percent of this material is difluoraminofluorodiazirine.

EXAMPLE 5

Difluoraminofluorodiazirine

About 22 ml. of a solution containing 1.46 grams ($5.5 \times 10^{-3}$ mole) of potassium iodide dissolved in acetonitrile containing 3% water is charged into a 1 liter round-bottomed flask fitted with a pressure stop-cock and a side arm and containing a stirring bar coated with polytetrafluoroethylene. An additional 50 ml. of the acetonitrile-water solvent are then added. This solution is cooled to liquid nitrogen temperature and degassed by reducing the pressure in the flask to not more than about 0.1 millimeter of mercury. 0.5 g. ($2.67 \times 10^{-3}$ mole) of tris(difluoroamino)fluoromethane is condensed into the side arm (which is cooled by a liquid nitrogen bath) and the flask is sealed. The potassium iodide solution is allowed to warm to room temperature with stirring and the liquid nitrogen bath is removed from the side arm thus allowing the tris(difluoramino)fluoromethane to volatilize and react with the reducing agent in the flask. Stirring is continued for an additional 1½ hours after which the pressure in the flask is reduced to less than about 0.1 mm. of mercury and approximately 20 ml. of volatile product and solvent are condensed into a −196° C. trap. This material is subjected to fractional distillation-condensation employing −23°, −78° and −196° C. receivers at a pressure of less than 0.1 mm. of mercury. A crude product amounting to $2.24 \times 10^{-3}$ mole is collected in the −196° C. receiver. Vapor phase chromatographic analysis indicates a 46 percent yield of difluoraminofluorodiazirine. Indentification of the pure product is accomplished by comparison of its infrared and $F^{19}$ nuclear magnetic resonance spectra with those of an authentic sample.

EXAMPLE 6

Fluoromethoxydiazirine

A dry 10 cc. capacity heavy walled glass ampoule is charged with 0.372 g. ($2.0 \times 10^{-3}$ mole) of dicyclopentadienyliron and four ml. of xylene hexafluoride. The ampoule is then cooled to —196° C. and the pressure therein reduced to not more than about 0.1 mm. of mercury pressure. About 0.246 g. ($1.92 \times 10^{-3}$ mole) of methoxytrifluoroformamidine is introduced and the ampoule is sealed. The mixture is allowed to come to room temperature and to remain for 1 hour at that temperature with stirring. The ampoule is then opened and the product is fractionated through —45° C. and —196° C. receivers. The —196° C. trap is found to contain $1.6 \times 10^{-3}$ mole of a mixture of volatile products. The contents of the —196° C. receiver are subjected to preparative vapor phase chromatographic separation from which is obtained $1.4 \times 10^{-3}$ mole (72.9% yield of pure fluoromethoxydiazirine, identified by its characteristic mass, infrared, ultraviolet and nuclear magnetic resonance spectra. The ultraviolet spectrum is characterized by a series of peaks in the 2900–3600 millimicron region and the infrared spectrum exhibits an absorption at 6.4 microns attributable to the diazirine ring.

EXAMPLE 7

Fluoromethoxydiazirine

A dry 10 cc. capacity heavy walled glass ampoule is charged with 0.186 g. ($1 \times 10^{-3}$ mole) of dicyclopentadienyliron and 1.5 ml. of xylene hexafluoride. The ampoule is then cooled to liquid nitrogen temperature and the pressure therein reduced to not more than about 0.1 mm. of mercury pressure. About 0.181 g. ($1 \times 10^{-3}$ mole) of $CH_3OC(NF_2)_2NFH$ is introduced and the ampoule sealed. The mixture is allowed to come to room temperature and to stir for one hour at that temperature. The ampoule is then opened and the product is fractionated as in Example 6. The —196° C. receiver is found to contain $1.5 \times 10^{-3}$ mole of volatile products identified as a mixture of difluoramine and fluoromethoxydiazirine by infrared spectroscopy. Pure fluoromethoxydiazirine ($0.65 \times 10^{-3}$ mole) is obtained by preparative vapor phase chromatography.

EXAMPLE 8

Cyanofluorodiazirine

A dry 3 cc. capacity heavy-walled glass ampoule is charged with 0.056 g. ($0.3 \times 10^{-3}$ mole) of dicyclopentadienyliron and 1 ml. of carbon tetrachloride. The ampoule is then cooled to —196° C. and the pressure therein reduced to not more than about 0.1 mm. of mercury pressure. About 0.036 g. ($0.3 \times 10^{-3}$ mole) of C-cyanotrifluoroformamidine is introduced and the ampoule is sealed. The mixture is allowed to come to room temperature (i.e. about 25° C.) and to stand for 1 hour at that temperature with periodic shaking. The ampoule is then opened and the product is fractionated as in Example 3. The —196° C. receiver is separated by vapor phase chromatography to afford pure cyanofluorodiazirine. The product is identified by the characteristic series of absorption bands in the 2900–3400 millimicron region in the ultraviolet spectrum and bands in the infrared spectrum at 4.5 and 6.35 microns attributable to the presence of the nitrile group and diazirine ring, respectively.

EXAMPLE 9

1-chloroperfluorodimethyldiazirine

Into a 20 ml. ampoule, containing 1.154 grams ($6.2 \times 10^{-3}$ mole) of dicyclopentadienyliron and 10 ml. of carbon tetrachloride, cooled to —196° C., is added 0.405 gram ($1.5 \times 10^{-3}$ mole) of 1-chloro-2,2-bis(difluoroamino)perfluoropropane by vacuum transfer techniques and the ampoule is sealed under vacuum. The ampoule is allowed to warm to about 25° C., is kept at that temperature for four days, during which time it is shaken periodically. The ampoule is then cooled to liquid nitrogen temperature, opened and its contents subjected to separation by fractional distillation-condensation techniques employing —78° C. and —196° C. receivers. The carbon tetrachloride is collected in the —78° C. receiver and the 1-chloroperfluorodimethyldiazirine in the —196° C. receiver. The pure product (boiling at about 28° C.), obtained in about a 45 percent yield after vapor phase chromatography, has infrared and fluorine nuclear magnetic resonance spectra consistent with the assigned structure.

About $1 \times 10^{-3}$ mole of 1-chloroperfluorodimethyldiazirine and $3 \times 10^{-3}$ mole of gaseous fluorine are charged to a 100 milliliter glass storage bulb, the glass being transmissive to ultraviolet irradiation down to approximately 3000 A. The gaseous mixture is irradiated from a distance of approximately 3 inches with 125 watt ultraviolet lamp for a period of 3 hours. Vapor phase chromatographic analysis indicates a greater than 30 percent yield of 1-chloroperfluoropropane. Comparison of the infrared spectrum of the purified product and an authentic sample of 1-chloroperfluoropropane confirms the assigned structure. This product is useful as a heat transfer medium, as a liquid coolant, as an inert reaction medium and as a refrigerant (see U.S. Pat. 2,490,764).

EXAMPLE 10

Perfluoropentyldiazirine

A dry 5 cc. heavy-walled glass ampoule is charged with 0.120 gram of dicumenechromium and 2 ml. of dichlorodifluoromethane. The ampoule is then cooled to liquid nitrogen temperature and 0.0404 gram of 1,1-bis(difluoroamino)perfluorohexane is introduced. The tube is sealed while under vacuum and the contents thereof are allowed to come to room temperature (about 25° C.). The resulting mixture is shaken for four days at room temperature. At the end of this time the ampoule is opened and the product is separated from the solvent by fractional distillation-condensation techniques using —23°, —78° and —196° C. receivers. Aprroximately $0.6 \times 10^{-4}$ moles of a volatile product is collected in the —78° C. trap. This product contains a major proportion of perfluoropentyldiazirine and a minor amount of the unconverted starting material of 1,1 - bis(difluoroamino) perfluorohexane.

A sample amounting to $5 \times 10^{-4}$ moles of perfluoropentyldiazirine and $5 \times 10^{-3}$ moles of chlorine gas are charged to a 150 milliliter glass storage bulb, the glass being transmissive to ultraviolet irradiation down to approximately 3000 A. The gaseous mixture is irradiated from a distance of approximately 3 inches with a 125 watt ultraviolet lamp for a period of 7 hours. Vapor phase chromatographic analysis indicates a greater than 40 percent conversion to 1,1-dichloroperfluorohexane. Infrared and nuclear magnetic resonance spectra of the purified product are consistent with the assigned structure. This product is useful as a solvent, a dielectric, a hydraulic mechanism fluid and as a transfer fluid (as shown in U.S. Pat. 2,658,928).

EXAMPLE 11

Difluorodiazirine

The preparation of perfluorodiaziridine,

is as follows:

A dry 148 ml. reactor was charged in the dry with 1.0 g. of rubidium fluoride, evacuated and $0.19 \times 10^{-3}$ moles of perfluoroformamidine condensed in with a −132° C. bath. After 19 hours at room temperature, the product gas consisted of $0.19 \times 10^{-3}$ moles of the unknown and impurities. The unknown, boiling point −35° C., was characterized as perfluorodiaziridine.

A dry 5 cc. capacity heavy-walled glass ampoule is charged with 0.056 g. ($0.3 \times 10^{-3}$ moles) of dicyclopentadienyliron (ferrocene) and 0.5 ml. of xylene hexafluoride. The ampoule is then cooled to −196° C. and about 0.017 g. ($0.15 \times 10^{-3}$ mole) of perfluorodiaziridine is condensed in and the ampoule is sealed. The mixture is allowed to come to room temperature and to stand for 1 hour at that temperature. The ampoule is then opened and the product mixture is fractionated as in Example 3. The −196° C. receiver contains about $0.1 \times 10^{-3}$ moles of volatile product identified as difluorodiazirine by a comparison of its infrared spectrum to that of an authentic sample of difluorodiazirine obtained in Example 1.

EXAMPLE 12

Fluoroisocyanatodiazirine

A dry 10 cc. capacity heavy-walled glass ampoule is charged with 0.223 g. ($1.2 \times 10^{-3}$ moles) of dicyclopentadienyliron and 2 ml. of xylene hexafluoride. The ampoule is then cooled to −196° C. and about 0.167 g. ($1.2 \times 10^{-3}$ moles) of isocyanatoperfluoroformamidine is condensed in and the ampoule is sealed. The mixture is allowed to come to room temperature and to stand for 1 hour at that temperature. The ampoule is then opened and the product mixture is fractionated as in Example 3. The −196° C. trap contains a mixture of unreacted starting material and fluoroisocyanatodiazirine. The diazirine is separated from the mixture by vapor phase chromatography and identified by its characteristic ultraviolet, infrared and nuclear magnetic resonance spectra.

The following table shows additional examples of fluorinated diazirines produced by following the process of the invention as specifically described in the preceding examples, starting with the compounds shown.

TABLE II

Product diazirine $$\begin{array}{c} N = \!\!= \!\!= N \\ \diagdown \;\; \diagup \\ C \\ \diagup \;\; \diagdown \\ R^1 \;\;\; R^2 \end{array}$$

| Starting NF containing compound [a] | R' | R² |
|---|---|---|
| $C_4F_9C(NF_2)_2C_4F_9$ | $-C_4F_9$ | $-C_4F_9$ |
| $N=CC(NF_2)_2F$ | $-F$ | $-C\equiv N$ |
| $N=C(NF_2)=NF$ | $-F$ | $-C\equiv N$ |
| $FC(NF_2)_3$ | $\{ \begin{array}{l} -F \\ -F \end{array}$ | $\begin{array}{l} -NF_2 \\ -F \end{array}$ |
| $(NF_2)_2C=NF$ | $\{ \begin{array}{l} -F \\ -F \end{array}$ | $\begin{array}{l} -NF_2 \\ -F \end{array}$ |
| $C(NF_2)_4$ | $\{ \begin{array}{l} -NF_2 \\ -F \\ -F \end{array}$ | $\begin{array}{l} -NF_2 \\ -NF_2 \\ -F \end{array}$ |
| $O=C=N-C(NF_2)=NF$ | $-F$ | $-N=C=O$ |
| $CH_3OC(NF_2)=NF$ | $-F$ | $-OCH_3$ |
| $CH_3OC(NF_2)_2NFH$ | $-F$ | $-OCH_3$ |
| $CH_3OC(NF_2)_3$ | $\{ \begin{array}{l} -NF_2 \\ -F \end{array}$ | $\begin{array}{l} -OCH_3 \\ -OCH_3 \end{array}$ |
| $(C_2H_5)_2N-C(NF_2)=NF$ | $-F$ | $-N(C_2H_5)_2$ |
| $(CH_3)_2C=NOC(NF_2)=NF$ | $-F$ | $-O-N=C(CH_3)_2$ |
| $CH_3\overset{O}{\overset{\|}{C}}OC(NF_2)=NF$ | $-F$ | $-O\overset{O}{\overset{\|}{C}}CH_3$ |
| $Cl\overset{\ominus}{O}_4\overset{\oplus}{H}_3NCH_2CH_2OC(NF_2)_2NFH$ | $-F$ | $-OCH_2CH_2N\overset{\oplus}{H}_3\overset{\ominus}{C}lO_4$ |
| $CH_3O\overset{O}{\overset{\|}{C}}CH_2OC(NF_2)_2NFH$ | $-F$ | $-OCH_2CO_2C_2H_5$ |
| $\overset{\oplus}{Na}\overset{\ominus}{O}_2CCH_2OC(NF_2)_2NFH$ | $-F$ | $-OCH_2\overset{\ominus}{C}\overset{\oplus}{O}_2Na$ |
| $CF_3CH_2OC(NF_2)=NF$ | $-F$ | $-OCH_2CF_3$ |
| $F_2NCHCH(NF_2)CH_2OC(NF_2)=NF$ | $-F$ | $-OCH_2CH(NF_2)CH_2NF_2$ |
| $ClC(NF_2)=NF$ [b] | $-F$ | $-Cl$ |
| $BrC(NF_2)=NF$ [b] | $-F$ | $-Br$ |
| $HFNC(NF_2)_2OCH_2CH_2OC(NF_2)_2NFH$ | $-F$ | $-OCH_2CH_2OCF\!\!\begin{array}{c}\diagup N \\ \| \\ \diagdown N\end{array}$ |
| $(NF_2)_2CFCF_2CF(NF_2)$ [c] | $-F$ | $-CF_2CF\!\!\begin{array}{c}\diagup N \\ \| \\ \diagdown N\end{array}$ |

[a] Reducing agent in all cases is dicyclopentadienyliron. The solvent which is utilized depends upon the physical properties of the diazirine products.
[b] C-chloroperfluoroformamidine and C-bromoperfluoroformamidine are prepared in low yields by the ultraviolet photolysis of a mixture of perfluoroguanidine and excess chlorine or excess bromine, respectively.
[c] 1,3-bis(difluoramino)perfluoropropane (prepared according to B. C. Bishop, J. B. Hynes and L. A. Bigelow, J. Am. Chem. Soc., 85, 1606 (1963)) is reacted with dicyclopentadienyliron in xylene hexafluoride solvent for 2 weeks to afford a 30.5% yield of 1,3-bis(fluorimino)perfluoropropane, $CF_2(CF=NF)_2$. 1,3-bis(fluorimino)perfluoropropane is reacted with ammonia in dimethylether solvent in the temperature range of −111 to −60° C. Low temperature fluorination of the di-adduct yields 1,1,3,3-tetrakis(difluoramino)perfluoropropane, $(F_2N)_2CFCF_2CF(NF_2)_2$.

What is claimed is:

1. A compound having up to 18 carbon atoms of the formula:

wherein R¹ and R² are covalently bonded substituents free from reactive organometallic groups and at least one of which contains covalently bonded fluorine.

2. A compound having the formula:

wherein R¹ and R² are each selected from the class consisting of fluorine and perhalocarbon groups containing from 1 to 6 carbon atoms in which not less than 60 percent of the halogen atoms are fluorine and the remainder are chlorine and wherein R¹ and R² can combine to form five and six-membered perfluorocycloaliphatic rings through the carbon atom to which they are attached.

3. A compound having the formula:

wherein R¹ and R² are perhalocarbon groups containing from 1 to 6 carbon atoms in which not less than 60 percent of the halogen atoms are fluorine and the remainder are chlorine.

4. A compound having the formula:

wherein R² is a perhalocarbon group containing from 1 to 6 carbon atoms in which not less than 60 percent of the halogen atoms are fluorine and the remainder are chlorine.

5. Difluorodiazirine.
6. 1-chloroperfluorodimethyldiazirine.
7. Perfluorodiethyldiazirine.
8. Perfluorocyclohexyldiazirine.
9. 3,4-dichloroperfluorobutyldiazirine.
10. Perfluoropropyldiazirine.
11. Perfluorohexyldiazirine.
12. A compound according to claim 1 wherein R² contains an alkoxy group.
13. A compound according to claim 1 wherein R² contains a cyano group.
14. A compound according to claim 1 wherein R² contains an isocyanate group.
15. A compound according to claim 1 wherein R² contains an amino group.
16. A compound according to claim 1 wherein R² contains a chlorine atom.
17. A compound according to claim 1 wherein R² contains a diazirine ring.
18. A compound according to claim 1 wherein R² contains a ester group.
19. A compound according to claim 1 wherein R² contains a difluoramino group.
20. A compound according to claim 1 wherein R² contains a functional group.
21. Difluoraminofluorodiazirine.
22. A compound having up to 18 carbon atoms of the formula:

wherein R² is a covalently bonded substituent free from reactive organometallic groups.

23. A compound according to claim 22, wherein R² contains a functional group.

24. A process for the preparation of fluorine containing diazirines containing up to 18 carbon atoms of the formula:

wherein R¹ and R² are covalently bonded substituents free from reactive organometallic groups and at least one of which contains covalently bonded fluorine, which comprises reacting a compound which contains at least two —NF— groups attached to a single carbon atom with a reducing agent at a temperature of from about 0° to 50° C.

References Cited

Dannley et al.: J. Org. Chem., vol. 27, pp. 599 to 602 (1962).

LELAND A. SEBASTIAN, Primary Examiner

U.S. Cl. X.R.

149—109; 204—163 R; 260—453 AL, 465.5 R, 482 R, 488 R, 534 R, 564 R, 566 AE, 583 NH, 584 C

UNITED STATES PATENT OFFICE
CERTIFICATE OF CORRECTION

Patent No. 3,637,663     Dated January 25, 1972

Inventor(s) Ronald A. Mitsch

It is certified that error appears in the above-identified patent and that said Letters Patent are hereby corrected as shown below:

Column 4, after line 67, insert --fer fluids, fire extinguishing agents, refrigerants and-- . Column 4, delete line 69. Column 7, line 24, "(1,72 x $10^{-4}$ mole)" should read --(1.72 x $10^{-4}$ mole)-- . Column 14, line 23, "$N=\underset{R_1\diagup{}^C\diagdown F^2}{}=N$" should read --$N=\underset{F\diagup{}^C\diagdown R^2}{}=N$-- .

Signed and sealed this 22nd day of August 1972.

(SEAL)
Attest:

EDWARD M. FLETCHER, JR.
Attesting Officer

ROBERT GOTTSCHALK
Commissioner of Patents